United States Patent [19]

Salter et al.

[11] 4,372,782

[45] Feb. 8, 1983

[54] RECOVERY OF LEAD AND SILVER FROM MINERALS AND PROCESS RESIDUES

[75] Inventors: Robert S. Salter; Roy S. Boorman; Ross D. Gilders, all of Fredericton, Canada

[73] Assignee: Provincial Holdings Ltd., Fredericton, Canada

[21] Appl. No.: 265,268

[22] Filed: May 20, 1981

[51] Int. Cl.$^3$ .................... C01G 21/22; C22B 7/00; C22B 13/00; C22B 11/00

[52] U.S. Cl. .................... 75/118 R; 75/120; 75/77; 75/83; 423/38; 423/94; 423/98; 423/593; 423/619

[58] Field of Search .................... 423/593, 619, 94, 98, 423/38; 75/83, 77, 118 R, 120

[56] References Cited

U.S. PATENT DOCUMENTS

| | | |
|---|---|---|
| 1,434,085 | 10/1923 | Christenson . |
| 1,549,062 | 8/1925 | Christensen . |
| 1,745,945 | 2/1930 | Mulock . |
| 2,109,755 | 3/1938 | Sessions . |
| 2,142,274 | 1/1939 | Kuss . |
| 3,477,928 | 11/1969 | Coltrinori .................... 204/123 |
| 4,063,933 | 12/1977 | Peters .................... 75/120 |
| 4,127,639 | 11/1978 | Piret .................... 75/120 |

FOREIGN PATENT DOCUMENTS

| | | |
|---|---|---|
| 456807 | 11/1972 | Australia . |
| 19918 | 2/1878 | Canada . |
| 228518 | 11/1919 | Canada . |
| 2500453 | 7/1976 | Fed. Rep. of Germany . |
| 2297253 | 1976 | France . |
| 2459292 | 1981 | France . |
| 365964 | 1932 | United Kingdom . |

OTHER PUBLICATIONS

Ermilov et al., *Trudy Institut Metallurgii Obogashcheniia*, vol. 30, (1969), p. 47.

Denev et al., *Dokl. Bolg. Akad. Nauk*, vol. 26, No. 11, (1973), p. 1485.

Lyon et al., "Innovations in the Metallurgy of Lead," U.S. Dept. Interior (1918) pp. 168, 169 (Bulletin 157).

*Primary Examiner*—Brian E. Hearn
*Attorney, Agent, or Firm*—Ladas & Parry

[57] ABSTRACT

Residues containing lead as lead sulphate and silver in the form of native silver or silver chloride, sulfide or sulphate, as well as silver complexes with other metals, and resulting from the roasting and leaching of sulfide concentrates containing lead, zinc, copper, and silver are treated to produce a high grade lead and silver product containing lead predominantly as calcium plumbate in a process wherein the residue is leached with brine, the resultant leach solution treated with lime to precipitate lead as oxychlorides, and the resultant lime-oxychloride precipitate is calcined to produce a mixture of calcium orthoplumbate and lead oxide. Residual chloride can be washed easily from this product which may then be treated in a lead blast furnace to recover lead and associated silver in their elemental state.

46 Claims, 3 Drawing Figures

RECOVERY OF LEAD AND SILVER FROM MINERALS AND PROCESS RESIDUES

This invention relates to the extraction of metal compounds from metal bearing materials and more particularly to the extraction and recovery of lead values in a calcium plumbate and/or oxide product from minerals or lead bearing materials. Silver which may be present in association with the lead may be recovered as native silver, silver chloride, sulfide or sulphate, or a silver complex with other metals, or in some other form from which it can be recovered by conventional techniques.

The recovery of a high grade lead product suitable for treatment for metal recovery from lead bearing minerals has usually been accomplished by flotation concentration of coarse grained lead sulphide deposits into a concentrate containing greater than 50% lead and pyrometallurgical reduction of this concentrate in a blast furnace. The reserves of these coarse grained lead sulphide deposits are rapidly being depleted. The major new reserves of lead are being found in fine grained massive sulphide deposits containing sulphides of zinc, lead, copper, silver, and iron. Recoveries into high grade lead concentrates are typically low from these deposits, necessitating significant reduction in grade to maintain economic recoveries. It will be necessary for some of these deposits to resort to the production of bulk zinc, lead, copper concentrates to insure high recoveries. Several new processes are available for treating these low grade and bulk type concentrates including ferric chloride leach processes, copper chloride leach processes, sulphuric acid-oxygen pressure leach processes and the sulphation roast process. The lead and silver in the latter two processes report in a low grade lead sulphate-hematite leach residue. In the ferric and cupric chloride leach processes, leach filtrates are produced which contain lead and silver as chlorides in a concentrated brine solution. The present process has application for lead and silver recovery from the leach residues and brine solutions generated in all of these processes.

Substantial reserves of lead and silver also exist in leach residues from electrolytic zinc plants. These residues typically assay 15-40% lead as lead sulphate and for the most part are considered as unsuitable as feed for a conventional lead smelter except in small amounts. Another source of low grade materials is slag from lead smelters. Lead is presently recovered from these slags by energy intensive fuming processes. The present process can be employed directly to recover lead and silver from zinc plant residues and after either sulphuric acid leaching or sulphation roasting to recover lead and silver from slags.

It is known that lead sulphate and associated silver may be solubilized by means of concentrated brines as proposed in Canadian Pat. No. 19,918, (1883); Canadian Pat. No. 228,518, (1919); and U.S. Bureau of Mines Bulletin 157, (1918). Whilst these methods solve the problem of separating the lead and silver from the residues there has been some economic difficulty in the subsequent recovery of the lead and silver from the solution in a usable form.

West German Pat. No. 2,500,453, (1976) describes a method of leaching lead sulphate containing material in sodium chloride solution and after residue separation, precipitating the Pb from solution with milk of lime. The lead precipitates contain greater than 10% chloride and 11% sulphate and are not acceptable to conventional lead smelters except in small amount and at depressed prices due to the deleterious effects of chlorides on acid plant catalysts, baghouses, and refractories.

Canadian Pat. No. 228,518, (1919); U.S. Pat. No. 4,063,933, (1977); and processes currently being developed by the U.S. Bureau of Mines, Minemet Recherche, (France), and Cominco Limited (Canada), advocate lead recovery by the precipitation of lead chloride crystals from solution by evaporation and/or cooling. The subsequent recovery of lead metal to be accomplished by electrolysis. Capital and operating costs are projected to be much higher for these processes than for conventional smelting.

Australian Pat. No. 28,957, (1971) describes a method of precipitating lead chloride from brine solution by cooling followed by reacting said lead chloride with water and calcium sulphate to produce a lead sulphate precipitate and calcium chloride solution. Although low chloride levels in the lead sulphate were obtainable with rigorous washing, the product is again suitable to lead smelters in limited quantities and must be treated on a sinter machine to remove sulphur before the blast. Capital and operating costs are projected to be high for the process since the brine solution must be heated for high lead solubility and then cooled for lead chloride precipitation.

Canadian Pat. No. 228,518, (1919) describes a method of lead recovery from concentrated brine solution by direct precipitation as sulphide or sulphate. These precipitates are difficult to wash and contain significant amounts of entrapped chlorides. Again conventional lead smelters will accept only small quantities.

Canadian Pat. No. 19,918 describes a method of precipitating lead and silver from brine solution by cementation on metallic zinc. Recently other researchers have rediscovered the cementation technique and advocate either zinc or iron as cementation media. High grade metallic lead and silver cementates are produced in these processes which are acceptable to lead smelters at premium prices at high tonnage. Considerable economic penalties are incurred to produce good quality cementates, however, since the cementation reagents are expensive and the zinc or iron in the lean brine resulting from cementation must be recovered in a form acceptable for sale or reuse. This can be accomplished only at considerable cost.

It is an objective of this invention to provide a process for the extraction and recovery of lead and silver into a product which will be acceptable to conventional lead smelters in large tonnages and at a premium price.

Further objectives are for the process to consume minimum energy and the reagents used to be recovered and either reused with high efficiency or credited in the sale of the lead product.

In accordance with a broad aspect of this invention there is provided a process comprising the steps of (1) preparing a solution of lead chloride by dissolving lead sulphate contained in an ore or process residue in an acidic, concentrated chloride brine; (2) separating the solution so formed from insoluble gangue or other residue; (3) forming a precipitate of lead oxychloride by adding lime to said solution and separating said lead oxychloride precipitate from the residual lean brine solution; (4) reacting the said oxychloride precipitate with oxygen and lime in a reactor at an elevated temperature to produce a calcine containing most of the lead as calcium plumbates and/or lead oxides; (5) washing said calcine in water and/or dilute chloride brine to dissolve soluble chlorides; (6) separating the resulting residue obtained from the resulting chloride brine; and, (7) washing said residue containing calcium plumbates and/or lead oxides with fresh water to remove residual chlorides.

In another broad aspect there is provided a process for gaining lead and silver values comprising the steps of (1) preparing a solution of lead chloride and silver compounds by dissolving lead sulphate and silver compounds contained in an ore or process residue in an acidic, concentrated chloride brine; (2) separating the solution so formed from insoluble gangue or other residue; (3) forming a precipitate of lead oxychloride and silver compounds by adding lime to said solution and separating said precipitate from the residual lean brine solution; (4) reacting the said oxychloride precipitate with oxygen and lime in a reactor at an elevated temperature to produce a calcine containing most of the lead as calcium plumbates and/or lead oxides and most of the silver as silver or silver compounds; (5) washing said calcine in water and/or dilute chloride brine to dissolve soluble chlorides; (6) separating the resulting residue from the resulting chloride brine; and, (7) washing said resiidue containing calcium plumbates and/or lead oxides, as well as silver and silver compounds, with fresh water to remove residual chlorides.

In accordance with another aspect of this invention we provide an improvement in a process comprising the step of (1) preparing a solution of lead chloride by dissolving lead sulphate contained in ore or process residues in concentrated chloride brine, thereby also dissolving any silver associated with the lead; (2) separating the solution so formed from the insoluble gangue and other residues; (3) forming a precipitate of lead oxychloride (and any silver which may be present) by adding lime to the solution and separating the lead oxychloride and silver precipitate from the residual lean brine solution; (4) recycling the lean brine, normally after concentration thereof such as by evaporation or by addition of further chloride and also normally after re-acidification by the addition of further acid, for reuse in the further extraction of lead sulphate as under steps (1) and (2). The improvement comprises (5) reacting the said precipitate containing lead oxychloride with oxygen such as by air and with excess lime present in the precipitate, and if desired adding fresh lime, in a reactor at a temperature above 325° C. for longer than one half hour to produce a calcine containing most of the lead as calcium plumbates and lead oxides, and containing any silver present as native silver, silver chloride, sulfide or sulphate, and complexes of silver with other materials; (6) repulping said calcine in water and/or dilute chloride brine to remove soluble chlorides; (7) separating the residue obtained in step (6) from the resulting chloride brine; (8) recycling the brine resulting from step (7), with the optional treatment mentioned above, for further extraction of lead sulphate under the previous steps; (9) washing the said residue from step (7) with fresh water to remove residual chlorides; and (10) recycling the chloride brine obtained in step (9) to step (6) and/or recycling the said chloride brine, again with the optional treatment mentioned above for reuse in the further extraction of lead sulphate under the previous step.

BRIEF DESCRIPTION OF THE DRAWINGS

In the drawings which accompany this invention.

The advantages of producing a calcium plumbate product are as follows:

(i) calcium plumbate is not water or cold brine soluble and will not react with chloride brines under neutral or basic conditions to reform lead oxychlorides.

(ii) entrained chlorides in the plumbate calcine cna be easily removed and reduced to very low levels by washing with water or unsaturated brine solution.

(iii) plumbate repulp solutions filter rapidly, leaving a dry residue.

(iv) plumbate products can be briquetted and fed directly into a lead smelter blast furnace without prior sintering, increasing smelter throughput for smelters in which the capacity is limited by the sinter machine.

(v) as reported by Denev, D. G. et al in Dokl. Bolg. Adkad. Nauk, Vol. 26, 11, 1973, page 1485 calcium orthoplumbate is an oxidant for lead sulphide at high temperature resulting in the products PbO, CaO and $SO_2$ and hence would make a good dilutant for galena concentrate on a sinter machine.

(vi) CaO is a product of the reduction of calcium plumbate and is also required as a slagging agent in lead blast furnaces, usually at high tonnages. Accordingly, since the use of some calcium plumbate as feed to a lead smelter would reduce the requirement for lime, some credit should be given for the lime in the plumbate product.

Figure 1:
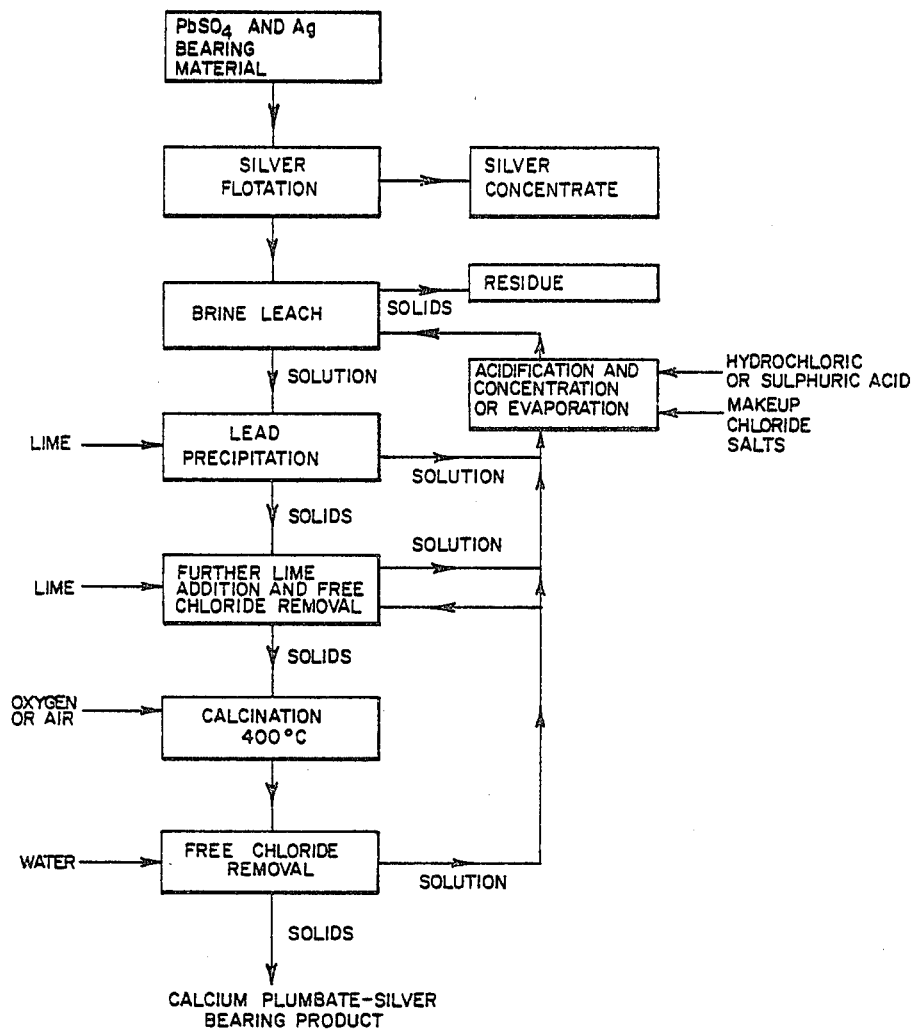
FIG. 1 is a schematic flow sheet showing certain aspects of the present invention.
Figure 2:
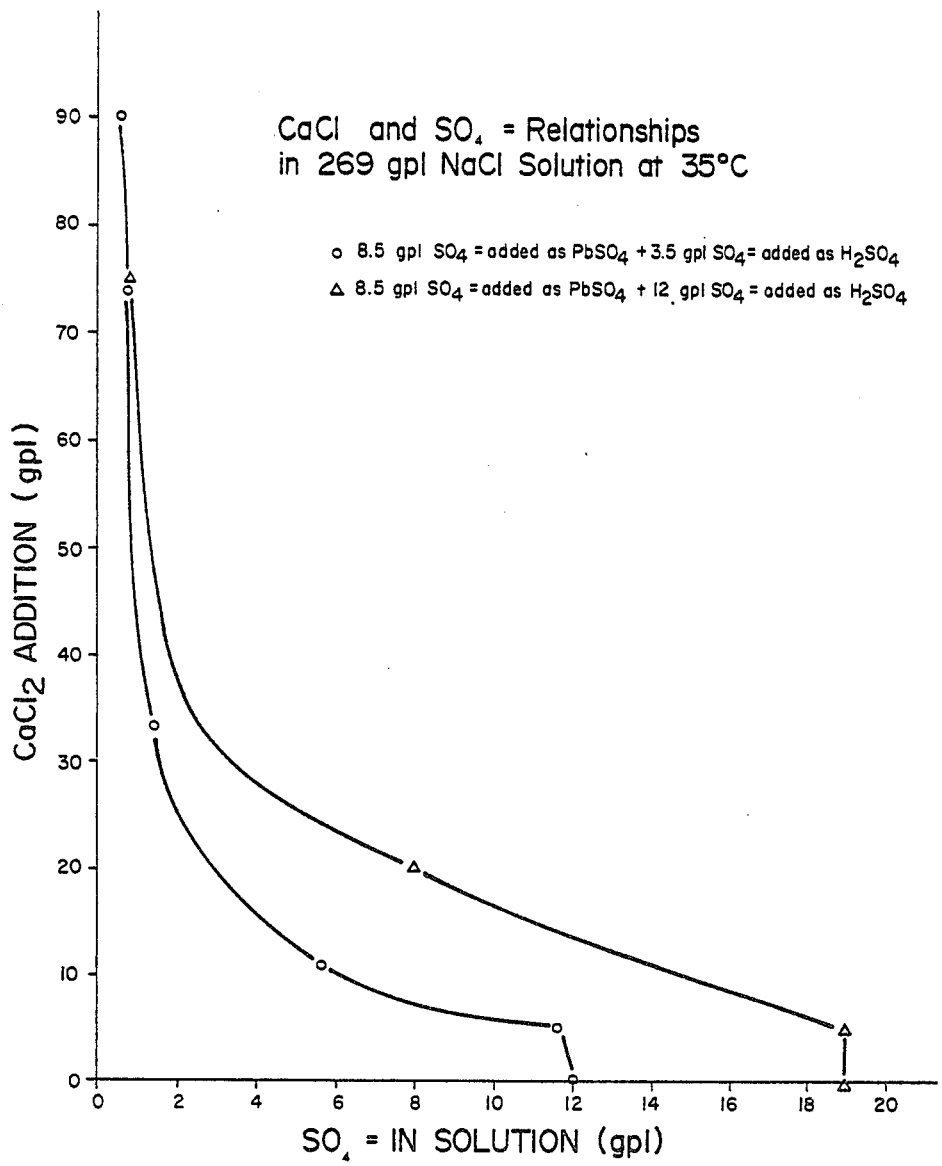
FIG. 2 is a graph showing the relationship between calcium chloride addition and sulphate in solution.

(vii) the production of a calcium plumbate product allows for the use of lime for the precipitaion of the lead from the brine leach solution and also as a reactant in the high temperature conversion of oxychloride to plumbate. Lime is a relatively inexpensive, easy to handle, environmentally, acceptable, and readily available commodity. (viii) the use of lime results in the formation of calcium chloride after the conversion of the metal chlorides (lead, zinc, copper, iron) to oxides. This calcium chloride is recycled in the brine to the lead sulphate leach and results in the precipitation of most of the sulphate as calcium sulphate into the leach residue. Accordingly the plumbate product is low in sulphate. Also, the low soluble sulphate in the leach enhances the solubility of lead and silver allowing for leach operation at lower temperatures, resulting in a lower energy consumption and less maintenance due to decreased corrosion. The effect of calcium chloride on sulphate solubility in sodium chloride brine solution is shown in FIG. 2. The solubility of lead as lead sulphate in 269 gpl NaCl brine increases from about 13 gpl at 35° C. to about 18 gpl (grams per liter) at 35° C. when $CaCl_2$ is added to yield a brine containing 34 gpl $CaCl_2$. Lead solubility is directly proportional to the brine saturation and the sulphate concentration in the brine.

Since calcium chloride is a more expensive commodity than sodium chloride and since there appears to be a lower limit to the soluble sulphate in the brine leach solution attainable with calcium chloride and since sodium chloride is easier to remove from leach residue by washing, it seems to be preferable but not necessary to use a concentrated sodium chloride brine as the base solution using the lime additions in steps (3) and (5) as the source of calcium chloride for sulphate removal. Small amounts of fresh NaCl and CaCl$_2$ will be required to make up for losses in the leach residue and product.

Lead and silver extractions into brine can be accelerated by increasing the acidity by addition of an acid such as hydrochloric or sulfuric acid which will ensure at least mildly acidic conditions. The optimum pH in the brine leach for high lead and silver extraction, efficient residue washing, and low lime consumption appears to be about 1.5.

Extractions of lead from lead sulphate material into brine are very high and may approach 99% with the proper choice of retention time, temperature, brine composition, and residue washing techniques as long as the solubility limit of the lead is not approached. Lead extractions fall from 99% to 75% of lead chloride saturation to 96% at 86% of saturation to 91% at 94% of saturation for brine leaching in 269 gpl NaCl-33 gpl CaCl$_2$-pH 1.5 brine at 35° C. and 1.5 hours leaching time. The saturation limit of lead as lead chloride in this brine is 18.3 gpl.

Silver extraction by brine is very dependent on the nature and prior history of the lead sulphate containing material. Some materials, usually those which have been very recently produced in a roaster or leach process exhibit silver extractions greater than 80%. Other materials, usually stockpiled, exhibit lower silver extractions of about 50%. Silver recoveries can be increased from these materials by flotation recovery of a silver concentrate and using the present process on the flotation tailings which contain most of the lead and all the remaining silver. The silver flotation concentrate and the plumbate produce can then be combined for sale to conventional lead smelters. Flotation processes such as described by Moriyama, E. and Yamamoto, Y. in AIME World Symposium of Mining and Metallurgy of Lead and Zinc, Vol. II, 1970, page 215 have been shown to yield silver concentrates with high silver assays and recoveries from lead sulphate containing materials.

Another option in the present process is the production of separate silver and lead products. Silver can be removed from the brine leach solution by cementation on a suitable metallic medium such as zinc, iron, or lead. With proper stoichiometric conditions, retention time, and pH nearly all the silver can be recovered in a high grade metallic product containing some little lead and copper as contaminants. Lead along with the solubilized cementation agent would then be recovered in the plumbate product as in steps (3)–(9).

When lead is precipitated from brine solution by the addition of a base as in step (3) of the process, the lead compounds formed will depend on the pH or the mole ratio of base to lead chloride and the total chloride concentration. Table 1 shows the effect of these variables on the nature of the lead precipitate when lead is precipitated from a brine solution containing 15 gpl lead as lead chloride at 45° C. and a retention time of 1.5 hours. Shorter retention times can be employed but chloride levels in the precipitate will increase unless the temperature is increased above 45° C. Silver is coprecipitated with lead. Most of the brine soluble impurities which are present in the lead sulphate containing starting material such as zinc, copper, iron, bismuth, and arsenic also coprecipitate with lead. The best process economics are obtained with lime as the precipitation agent at an addition rate between 1.0 and 5.5 mole ratio of lime to lead chloride. The excess lime also acts as a flocculating agent for oxychloride precipitate, resulting in improved solid/liquid separation.

TABLE 1
Effect of the Mole Ratio of Base to Lead Chloride and the Total Chloride Concentration on the Lead Precipitate

| Base | NaCl Concentration | CaCl$_2$ Concentration (gpl) | Mole Ratio | Lead Precipitate |
|---|---|---|---|---|
| CaO | 269 | 15 | 0.75 | PbOHCl |
| Na$_2$CO$_3$ | 269 | 15 | 1.0 | PbOHCl |
| NaOH | 269 | 15 | 2.0 | PbOHCl |
| CaO | 269 | 15 | 1.5 | 3PbO.PbCl$_2$.nH$_2$O + minor 2PbO.PbCl$_2$.nH$_2$O |
| CaO | 269 | 33 | 1.5 | 3PbO.PbCl$_2$.nH$_2$O + minor 2PbO.PbCl$_2$.nH$_2$O |
| Na$_2$CO$_3$ | 269 | 33 | 1.5 | 3PbO.PbCl$_2$.nH$_2$O + minor 2PbO.PbCl$_2$.nH$_2$O |
| NaOH | 269 | 33 | 3.0 | 3PbO.PbCl$_2$.nH$_2$O + minor 2PbO.PbCl$_2$.nH$_2$O |
| CaO | 269 | 33 | 10.0 | 3PbO.PbCl$_2$.nH$_2$O |
| NaOH | 269 | 33 | 20.0 | 6PbO.PbCl$_2$.nH$_2$O |

Although it is desirable to produce a precipitate containing as little chloride as possible, very low chlorie-oxychlorides cannot be precipitated from concentrated brine unless uneconomic quantities of sodium hydroxide are used. Since they are very soluble, all excess sodium hydroxide and/or sodium carbonate must be neutralized with hydrochloric acid before the lean brine resulting from precipitate separation can be recycled to the brine leach step (1). The use of sodium hydroxide precipitating agent also results in excessive reagent calcium chloride makeup requirements.

Ermilov, V.V. and Aitenov, S. A. in Trudy Institut Metallurgi Obogashcheniia, Vol. 30, 1969, page 47 proposed a method for producing a lead (iv) oxide precipitate from concentrated brine by adding equal molar quantities of calcium oxide and calcium hypochlorite to lead chloride. Although the reaction is irreversible and regenerates calcium chloride into solution, and the product can easily be washed to less than 0.5% chloride, the economics are unfavourable due to the value of hypochlorite in comparison to lead metal and lime.

If the lime addition in the precipitation step (3) was less than 2.5 mole ratio to lead, then after separation of the lead oxychloride precipitate from the lean brine solution, the precipitate is repulped with water or any reasonably unsaturated brine solution produced in the process. Lime is added to the pulp to bring the mole ratio of the total lime addition in the process to between 2.5 and 5.5. After solid/liquid separation the pulp is subjected to thermal treatment. Alternatively the lead oxychloride precipitate may be blended with lime to increase the total mole ratio to between 2.5 and 5.5, without repulping and the blend subjected to thermal treatment.

If the lime addition in step (3) was greater than 2.5 mole ratio to lead, then repulping and/or further lime addition is not necessary before thermal treatment.

The lead oxychloride-lime blend is heated in a reactor in the presence of oxygen or air. The reactor can be a rotary kiln, furnace, roaster, autoclave or any device commonly used for thermal treatment. The retention time in the reactor depends upon the desired degree conversion of oxychloride to plumbate and oxide, the temperature in the reator, the lime to lead mole ratio, and the oxygen partial pressure. The effects of these variables on the nature of the calcine product are shown in Table 2. At reaction temperatures of above 500° C. sintering of the product appears and volatilization of lead chloride begins. Preferred conditions appear to be a total process lime addition to lead mole ratio of about 3, a reaction temperature of about 400° C., a retention time of about 1 hour, and an excess of oxygen for lead oxidation. Pressure above atmospheric is not required for the reaction to be complete within 2 hours. Sufficient air or oxygen can be supplied for the reaction by convection, free or forced, or by pressurizing the reactor.

kinetics and energetics of plumbate formation have been altered significantly from commercial experience.

Figure 3:
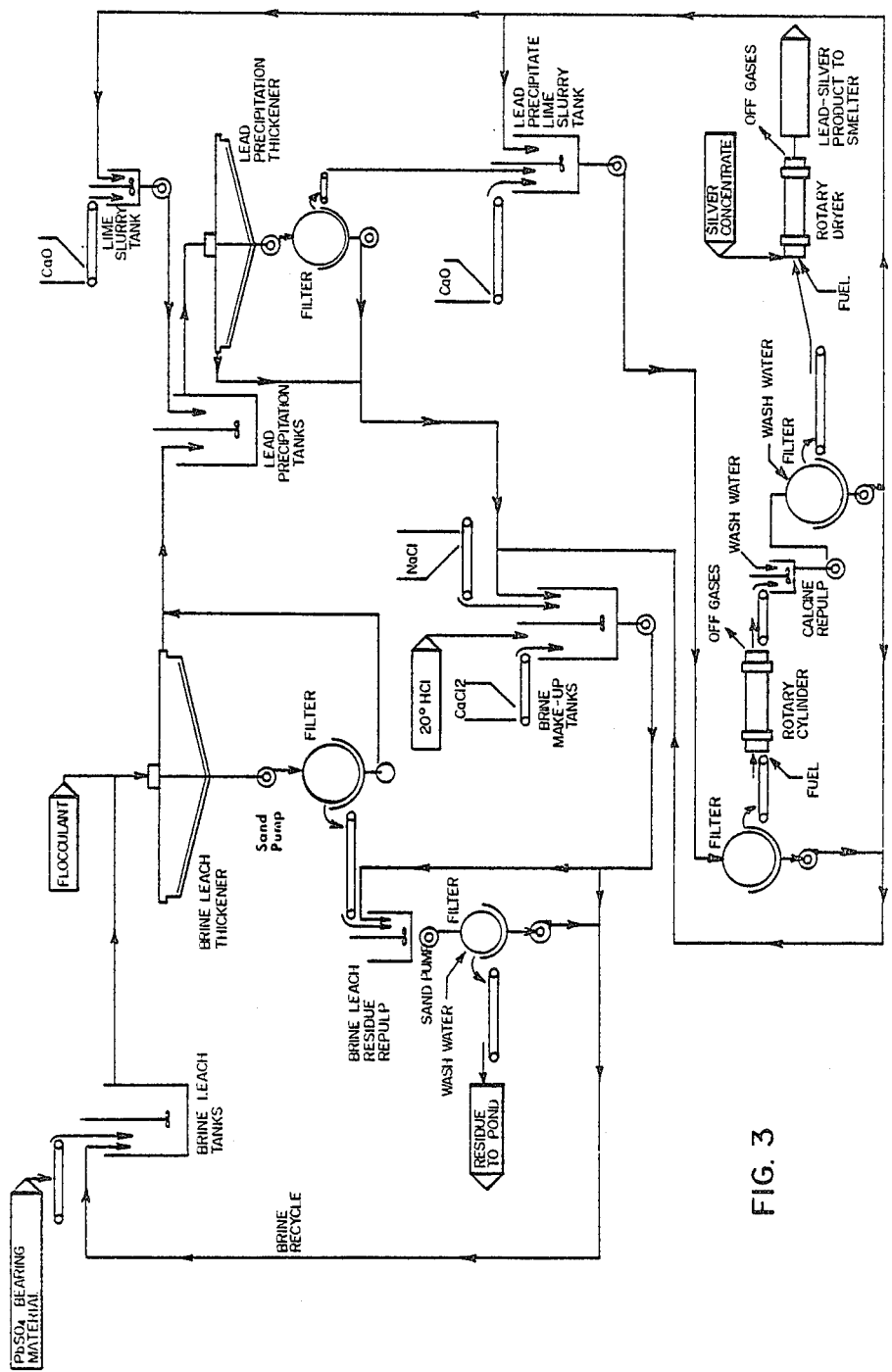
FIG. 3 is a schematic flow sheet showing a lead-silver recovery plant employing certain aspects of this invention.

FIG. 3 is a schematic plant layout for a particular embodiment of the invention relating to example 1.

The following examples illustrate the practice of our invention but should not be construed as limiting.

EXAMPLES 1 to 8 INCLUSIVE

Samples of hot sulphuric acid leach residues obtained from the sulphation roasting and leaching of bulk zinc-lead-copper-silver sulphide concentrates assaying 30-32% Zn, 3.5-10% Pb, 0.7% Cu, 4.4-8.8 oz/ST (troy ounce per short ton) silver, and 14-23% iron were processed accordingly to the invention. A sample (example 10) of a hot acid leach residue from a dead roast zinc plant was also processed. The residues assayed as in Table 3.

The residues were leached in brines of composition given in Table 4. Residue was added at a ratio of 15 gm of contained lead per liter of brine. The leaches were conducted at 35°-40° C. for 1.5 hours. Leach residues were allowed to settle and the thickened residues filtered and washed with fresh brine. Extractions of lead and silver are given in Table 5. All of the zinc, iron and copper as sulphates in the hot sulphuric acid leach residues leached along with the lead and silver. Copper and bismuth assays in the brine were 40 and 45 mgpl respectively.

One pregnant brine solution (example #6) was treated with zinc dust at an addition rate of 0.5 gpl producing a cementate containing 99% of the silver, 95% of the copper and 80% of the bismuth in the preg-

TABLE 2

| Calcination of Lead Oxychloride Precipitate-Lime Blends | | | | |
|---|---|---|---|---|
| Total Process Lime Addition (mole ratio to lead) | Temperature (°C.) | Retention Time (hr.) | Atmosphere | Ca—Pb Products in Calcine |
| 1.75 | 400 | 0.5 | air | $Ca_2PbO_4$ + $3PbO.PbCl_2$ + CaO |
| 2.6 | 400 | 0.5 | air | $Ca_2PbO_4$ + $3PbO.PbCl_2$ + CaO |
| 5.5 | 400 | 0.5 | air | $Ca_2PbO_4$ + $3PbO.PbCl_2$ + CaO |
| 2.6 | 400 | 1.5 | air | $Ca_2PbO_4$ + $3PbO.PbCl_2$ + CaO |
| 3.0 | 400 | 2.0 | air | $Ca_2PbO_4$ + CaO + PbO |
| 3.0 | 400 | 1.0 | air | $Ca_2PbO_4$ + CaO + PbO |
| 5.0 | 400 | 2.0 | air + CO* | $Ca_2PbO_4$ + CaO |
| 2.6 | 400 | 2.0 | air | $Ca_2PbO_4$ + $3PbO.PbCl_2$ + CaO |
| 5.0 | 350 | 1.0 | air | $Ca_2PbO_4$ + $3PbO.PbCl_2$ + CaO |
| 2.5 | 325 | 2.0 | air | $3PbO.PbCl_2$ + CaO |

*CO at 10% of air partial pressure.

It is surprising that calcium orthoplumbate ($Ca_2PbO_4$) is formed at high yields with such low temperatures and short retention times. Calcium orthoplumbate in a pure form (>90%) is a valuable commodity and is used in the manufacture of primers for steel and galvanized steel, of pigments and of binders for paints. It also has use in the plastics and resin industries. The common commercial production method is the reaction of PbO with lime and air or oxygen at temperatures above 700° C. The reaction kinetics are reportedly slow below this temperature and the reaction will not go below 500° C. It has been reported by Denev, D. G. et al in Dokl-.Bolg.Akad.Nauk, Vol. 26 11, 1973, page 1485, however, that additions of small quantities of NaCl to the reaction mixture speed the kinetics. The present invention differs from the customary practice in that the reagent for calcination is lead oxychloride and not lead oxide. Also, the oxychloride is contaminated with significant quantities of NaCl and $CaCl_2$. Accordingly, the nant brine.

The remaining pregnant brines and the solution resulting from the zinc dust cementation test were then treated with lime at 1.5 mole ratio to lead in the brine solution. The temperature and retention time were 45° C. and 1.5 hours respectively.

Precipitates were allowed to settle and the thickened precipitates filtered.

The precipitates in all tests were then blended with lime, as required, to bring the total mole ratio of lime added to the process to lead in the precipitate to 1.75-5.5.

TABLE 3

| Assays (wt %) of Hot Acid Leach Residues (Dry Basis) | | | |
|---|---|---|---|
| | Example # | | |
| | 1-8 | 9 | 10 |
| $ZnFe_2O_4$ | 1.5 | 1.5 | 5.0 |
| (Zn,Fe)S | 1.0 | 0.9 | 1.0 |
| $Fe_2O_3$ | 52.8 | 63.2 | 10.0 |
| $PbSO_4$ | 31.1 | 10.9 | 46.7 |

TABLE 3-continued

| | Assays (wt %) of Hot Acid Leach Residues (Dry Basis) | | |
|---|---|---|---|
| | | Example # | |
| | 1–8 | 9 | 10 |
| $CaSO_4.2H_2O$ | 6.8 | 6.2 | 6.0 |
| $SiO_2$ | 1.8 | 1.8 | 25.0 |
| As | 0.2 | 0.2 | 0.5 |
| $S^o$ | 0.6 | 0.5 | 0.3 |
| $ZnSO_4$ | 1.1 | 4.0 | 0.5 |
| $CuSO_4$ | 0.1 | 0.3 | 0.1 |
| $Fe_2(SO_4)_3$ | 1.6 | 5.7 | 0.7 |
| Ag (ppm) | 639 | 310 | 250 |
| Gangue | 0.4 | 0.4 | 3.0 |

TABLE 4

| | Brine Compositions | | | |
|---|---|---|---|---|
| Example # | $MgCl_2$ (gpl) | NaCl (gpl) | $CaCl_2$ (gpl) | pH |
| 1 | — | 300 | — | 1.5 |
| 2 | — | 250 | — | 1.5 |
| 3 | — | 269 | 15 | 1.5 |
| 4 | — | 269 | 33 | 1.5 |
| 5 | — | 269 | 33 | 4.5 |
| 6 | — | 269 | 33 | 1.5 |
| 7 | 280 | — | 33 | 1.5 |
| 8 | 50 | 220 | 33 | 1.5 |
| 9 | — | 269 | 33 | 1.5 |
| 10 | — | 269 | 33 | 1.5 |

TABLE 5

| | Extractions of Lead and Silver | |
|---|---|---|
| Example # | Pb extraction (%) | Ag extraction (%) |
| 1 | 93 | 65 |
| 2 | 75 | 50 |
| 3 | 92 | 62 |
| 4 | 99 | 77 |
| 5 | 96 | 47 |
| 6 | 98 | 75 |
| 7 | 95 | 70 |
| 8 | 95 | 70 |
| 9 | 97 | 71 |
| 10 | 96 | 69 |

TABLE 6

| | Lime Addition and Plumbate Product (Dry Basis) Assays (Wt %) | | | | | | |
|---|---|---|---|---|---|---|---|
| Example # | Total Lime (mole ratio) to lead | Pb | Ca | Cl | Fe | Zn | Ag (oz/ST) |
| 1 | 3.0 | 60 | 22 | 0.6 | 1.4 | 1.5 | 34 |
| 2 | 1.75 | 67 | 12 | 4.8 | 1.8 | 1.9 | 38 |
| 3 | 4.0 | 51 | 29 | 0.3 | 1.2 | 1.2 | 27 |
| 4 | 3.0 | 60 | 22 | 0.4 | 1.2 | 1.1 | 41 |
| 5 | 5.5 | 42 | 36 | 0.2 | 1.0 | 1.0 | 17 |
| 6 | 3.0 | 57 | 21 | 0.4 | 1.3 | 3.3 | <1 |
| 7 | 3.0 | 59 | 22 | 0.4 | 1.3 | 1.3 | 37 |
| 8 | 3.0 | 60 | 22 | 0.5 | 1.2 | 1.3 | 38 |
| 9 | 3.0 | 54 | 20 | 0.4 | 3.0 | 3.0 | 50 |
| 10 | 3.0 | 61 | 22 | 0.5 | 0.7 | 0.7 | 40 |

The blends were treated in an oven with a slow purge of fresh air for 1.0 hours at 400° C. The calcines were repulped to 50% pulp density for 15 minutes in fresh water and filtered and displacement washed with a volume of water equal to the calcine repulp water. The assays (dry basis) of the resulting plumbate products are given in Table 6.

EXAMPLE 11

A sample of the hot sulfuric acid leach residue used in example 5 was repulped in water at 10% pulp density, American Cyanamid flotation reagents Aero 404 (trade mark) promoter and Aerofroth 77A (trade mark) (frother) were added at 600 g. and 60 g. per metric ton of residue respectively. After 5 minutes conditioning time, flotation was initiated and a stable froth was maintained for about 7.5 minutes. The concentrate obtained assayed 18% Pb, 24% Fe, 1.8% Zn, and 635 oz/ST silver. Silver recovery from the head material was 70%.

The tailings from the flotation were treated in the process exactly similar to example 4. Silver recovery from the tailings was 35%, resulting in an overall silver recovery of 81%.

As will be apparent to those skilled in this art, the process of this invention may be applied to the recovery of metals from a variety of metallurgical products such as ores and concentrates, smelter dusts, metal drosses, middling concentrates from flotation processing, slags and process residues, and other like sources of lead and silver.

The embodiments of the invention in which an exclusive property or privilege is claimed are defined as follows:

1. In a process comprising the steps of (1) preparing a solution of lead chloride by dissolving lead sulphate contained in an ore or process residue in an acidic, concentrated chloride brine; (2) separating the solution so formed from insoluble gangue or other residue; (3) forming a precipitate of lead oxychloride by adding lime to said solution and separating said lead oxychloride precipitate from the residual lean brine solution; (4) recycling said lean brine for reuse in the further extraction of lead sulphate as under steps (1) and (2); the improvement which comprises (5) reacting the said oxychloride precipitate with oxygen and lime in a reactor at a temperature above 325° C. for longer than 0.5 hours to produce a calcine containing most of the lead as calcium plumbates and/or lead oxides; (6) repulping said calcine in water and/or dilute chloride brine to dissolve soluble chlorides; (7) separating the residue obtained in step (6) from the resulting chloride brine; (8) recycling the brine resulting from (7) for reuse in the further extraction of lead sulphate as under steps (1) and (2); (9) washing said residue containing calcium plumbates and/or lead oxides resulting from step (7) with fresh water to remove residual chlorides; and (10) recycling the chloride brine obtained in step (9) to step (6) and/or recycling the said chloride brine for reuse in the further extraction of lead sulphate as under steps (1) and (2).

2. In a process for gaining lead and silver values comprising the steps of (1) preparing a solution of lead chloride and silver compounds by dissolving lead sulphate and silver compounds contained in an ore or process residue in an acidic, concentrated chloride brine; (2) separating the solution so formed from insoluble gangue or other residue; (3) forming a precipitate of lead oxychloride and silver compounds by adding lime to said solution and separating said precipitate from the residual lean brine solution for recycling said lean brine for reuse in the further extraction of lead sulphate as under steps (1) and (2); the improvement which comprises (5) reacting the said oxychloride precipitate with oxygen and lime in a reactor at a temperature above 325° C. for longer than one half hour to produce a calcine containing most of the lead as calcium plumbates and/or lead oxides and most of the silver as silver or silver compounds; (6) repulping said calcine in water and/or dilute chloride brine to dissolve soluble chlorides; (7) separating the residue obtained in step (6) from the resulting chloride brine; (8) recycling the brine resulting from (7) for reuse in the further extraction of lead sulphate as under steps (1) and (2); (9) washing said residue containing calcium plumbates and/or lead oxides, as well as silver and silver compounds resulting from step (7) with fresh water to remove residual chlorides; and (10) recycling the chloride brine obtained in step (9) to step (6) and/or recycling the said chloride brine for reuse in the further extraction of lead sulphate as under steps (1) and (2).

3. A process as in claim 1 wherein the lime in step (5) is excess lime present in the precipitate from step (3).

4. A process as in claim 3 wherein fresh lime is added to supplement the excess lime present in the precipitate.

5. A process as in claim 2 wherein the lime in step (5) is excess lime present in the precipitate from step (3).

6. A process as in claim 2 wherein the fresh lime is added to supplement the excess lime present in the precipitate.

7. A process according to claim 1 wherein the concentrated chloride brine comprises a saturated or nearly saturated solution at room temperature of one or more inorganic chlorides in water.

8. A process according to claim 1 or claim 2 wherein one component of the chloride brine is calcium chloride.

9. A process according to claim 1 or claim 2 wherein the chloride brine comprises an aqueous solution of calcium chloride and one or both of sodium and magnesium chloride.

10. A process according to claim 1 or claim 2 wherein the chloride brine includes calcium chloride, and wherein the mole ratio of calcium chloride to lead sulphate is greater than 4.

11. A process according to claim 1 wherein step (1) is performed at a temperature in the range 30° C. to the boiling point of the chloride brine, at a pH between 1.5 and 4.5, and a retention time of 0.5–2.5 hours.

12. A process according to claim 11 wherein the temperature is ambient.

13. A process according to claim 11 wherein the pH is controlled at 1.5.

14. A process according to claim 11 wherein the retention time is 1.5 hours.

15. A process according to claim 1 wherein step (3) is performed by adding lime at a mole ratio of between 0.75 and 5.5 to dissolved lead.

16. A process according to claim 15 wherein lime is added at a mole ratio of 1.5 to dissolved lead.

17. A process according to claim 15 wherein the retention time is between 0.5 and 2.5 hours and the temperature in the range 30° C. to the boiling point of the chloride brine.

18. A process according to claim 17 wherein the retention time is 1.5 hours and the temperature is ambient.

19. A process according to claim 1 wherein step (5) is performed by adding lime to the said oxychloride precipitate to increase the total of the lime additions in step (3) and step (5) to between 1.75 and 5.5 mole ratio to lead.

20. A process according to claim 19 wherein the total lime addition is 3.0 mole ratio to lead.

21. A process according to claim 1 wherein step (5) is performed at a temperature above 350° C. for longer than 0.5 hours.

22. A process according to claim 21 wherein the temperature is 400° C. for 1.0 hour.

23. A process according to claim 1 wherein step (5) is performed with a mole ratio of oxygen to lead in excess of 0.5.

24. A process as in claim 23 wherein the oxygen is in the form of air.

25. A process according to claim 2 wherein lead and silver are recovered in the residue from calcine washing step (9).

26. A process according to claim 1 wherein lead is recovered in the residue from calcine washing step (9).

27. A process according to claim 2 wherein silver is recovered by cementation on one of metallic zinc, iron, or lead between step (2) and step (3).

28. A process according to claim 2 wherein a portion of the silver is recovered from the lead sulphate containing material by flotation prior to step (1).

29. A process as in claim 1 or 2 wherein the brine is concentrated before recycling.

30. A process as in claim 1 or 2 wherein the brine is concentrated by evaporating or by adding further chloride before recycling.

31. A process as in claim 1 or 2 wherein the brine is re-acidified before recycling.

32. A process as in claim 1 or 2 wherein the acidic, concentrated chloride brine has a pH of about 1.5.

33. A process according to claim 2 wherein step (1) is performed at a temperature in the range 30° C. to the boiling point of the chloride brine, at a pH between 1.5 and 4.5, and a retention time of 0.5–2.5 hours.

34. A process according to claim 33 wherein the temperature is ambient.

35. A process according to claim 33 wherein the pH is controlled at 1.5.

36. A process according to claim 33 wherein the retention time is 1.5 hours.

37. A process comprising the steps of (1) preparing a solution of lead chloride by dissolving lead sulphate contained in an ore or process residue in an acidic, concentrated chloride brine; (2) separating the solution so formed from insoluble gangue or other residue; (3) forming a precipitate of lead oxychloride by adding lime to said solution and separating said lead oxychloride precipitate from the residual lean brine solution; (4) reacting the said oxychloride precipitate with oxygen and lime in a reactor in an elevated temperature to produce a calcine containing most of the lead as calcium plumbates and/or lead oxides; (5) washing said calcine in water and/or dilute chloride brine to dissolve soluble chlorides; (6) separating the resulting residue obtained from the resulting chloride brine; and, (7) washing said residue containing calcium plumbates and/or lead oxides with fresh water to remove residual chlorides.

38. A process as in claim 37 wherein the chloride brines resulting from the steps are recycled for reuse in the process.

39. A process for gaining lead and silver values comprising the steps of (1) preparing a solution of lead chloride and silver compounds by dissolving lead sulphate and silver compounds contained in an ore or process residue in an acidic, concentrated chloride brine; (2) separating the solution so formed from insoluble gangue or other residue; (3) forming a precipitate of lead oxychloride and silver compounds by adding lime to said solution and separating said precipitate from the residual lean brine solution; (4) reacting the said oxychloride precipitate with oxygen and lime in a reactor at an elevated temperature to produce a calcine containing most of the lead as calcium plumbates and/or lead oxides and most of the silver as silver or silver compounds; (5) washing said calcine in water and/or dilute chloride brine to dissolve soluble chlorides; (6) separating the resulting residue from the resulting chloride brine; and, (7) washing said residue containing calcium plumbates and/or lead oxides, as well as silver and silver compounds, with fresh water to remove residual chlorides.

40. A process as in claim 43 wherein the chloride brines resulting from the steps are recycled for reuse in the process.

41. In a process comprising the step of (1) forming a precipitate of lead oxychloride by adding lime to a chloride brine solution containing lead chloride, and separating said lead oxychloride precipitate from the residual lean brine solution; the improvement which comprises (2) reacting the said oxychloride precipitate with oxygen and lime in a reactor at a temperature above 325° C. for longer than 0.5 hours to produce a calcine containing most of the lead as calcium plumbates and/or lead oxides; (3) repulping said calcine in water and/or dilute chloride brine to dissolve soluble chlorides; (4) separating the residue obtained in step (3) from the resulting chloride brine; and (5) washing said residue containing calcium plumbates and/or lead oxides resulting from step (4) with fresh water to remove residual chlorides.

42. A process according to claim 41 wherein the chloride brines lean in lead resulting from any of the steps (1), (4), or (5) are recycled to dissolve fresh lead chloride.

43. A process according to claim 42 wherein the brine is concentrated before recycling.

44. A process according to claim 43 wherein the brine is concentrated by evaporating or by adding further chloride before recycling.

45. A process according to claim 42 wherein the brine is re-acidified before recycling.

46. A process according to claim 45 where in the acidic concentrated chloride brine has a pH of about 1.5.

* * * * *